Nov. 13, 1951  W. C. BUTTNER ET AL  2,575,312
REGULATOR NOZZLE
Filed May 27, 1946

William C. Buttner
Savin L. Sundstrom
INVENTORS

BY
Atty

Patented Nov. 13, 1951

2,575,312

UNITED STATES PATENT OFFICE 2,575,312

REGULATOR NOZZLE

William C. Buttner, Winnetka, and Savin L. Sundstrom, Chicago, Ill., assignors to The Bastian-Blessing Company, Chicago, Ill., a corporation of Illinois Application May 27, 1946, Serial No. 672,660

7 Claims. (Cl. 251—167)

This invention relates generally to pressure regulators and more specifically to an improved inlet valve nozzle for oxygen regulators.

Oxygen is commonly stored in steel cylinders under pressures 2000 to 2400 pounds per square inch. Before oxygen stored in this manner can be used for heating and welding with a blowpipe, medicinal purposes or any one of a number of other purposes, its pressure must first be reduced to a value suitable to the apparatus using the gas and this is usually accomplished by a regulator employing a diaphragm controlled valve.

With oxygen, a difficulty is experienced in the pressure regulator which does not occur with any other gases. Such is the ignition of the valve disc used in the regulator.

It is the common practice in regulators to make the inlet valve disc out of hard rubber or other resilient material to attain a positive seal when the valve is closed. All the materials which have been found to be satisfactory for valve discs are inflammable in the presence of high pressure oxygen and although some are more resistant to ignition than others the superior resistance is only a matter of degree and additional means must be employed to attain the necessary degree of safety.

It is well known in the art of chemistry that most chemical reactions involving gases and solids will occur with greater speed and at lower temperatures if the pressure on the gas is elevated. This is due to the fact that a gas is more dense under high pressure and more molecules of the gas are confined in a given space. Since reaction cannot occur except when a molecule of the gas strikes a molecule of the solid, an increase in the number of gas molecules in the vicinity of the solid will result in a higher rate of reaction. For the same reason a pure gas will usually react with more speed than a gas which is mixed with another non-reacting gas. Consequently, oxygen under high pressure is much more likely to cause ignition than oxygen under low pressure or than air which is a mixture of oxygen and other gases.

It is also known in the science of thermodynamics that gases are cooled by expansion and conversely heated when compressed. If a volume of oxygen is compressed from atmospheric pressure and temperature to 2000 pounds per square inch without any heat escaping from the gas to its confining parts, the temperature will rise to more than 1500° F., and, although heat does escape, the heat transfer requires appreciable time. Consequently, the more rapid the compression, the hotter the compressed gas will become.

If a pressure regulator is attached to an oxygen cylinder by a conduit and the valve on the cylinder is suddenly opened, oxygen under high pressure flowing out of the cylinder will carry ahead of it the oxygen already in the conduit and compress same almost instantly at the far end of the conduit. If the end wall of the conduit is the inlet valve disc in a regulator, most of the heat formed by the compression will be concentrated at this point. The sudden increase of the temperature of the oxygen will cause the valve disc material of the inlet valve to ignite, and the disc will burn away causing rapid leakage of high pressure oxygen into the low pressure chamber and cause the regulator to explode under the uncontrolled pressure.

Because such ignition and subsequent explosions can be extremely dangerous, many attempts have been made to find a non-flammable valve disc material. Some improvement has rewarded the experimenters, but many explosions with consequent loss of life or injury have still occurred.

In the past attempts have also been made to alter the construction of regulators in order to provide obstructions in the path of the gas stream and make the compression occur at some other point than directly on the valve disc. Much progress has been made in this direction but many difficulties are still incurred. Much of the shortcomings remaining with the use of obstructions is probably due to the fact that the obstructions have been located too far away from the valve disc to disperse the heat and a second compression occurs in the oxygen passage between the obstruction and the disc. This compression, although not as dangerous as when no obstructions are present may still cause ignitions under unexpected conditions, particularly if a full, oxygen cylinder is connected to a sun-warmed conduit and regulator.

Regulators may also be easily damaged when foreign particles are present in the inlet conduit. These particles are swept along by rapidly flowing gas stream and become imbedded in or scar the surface of the valve disc.

One object of this invention therefore is to provide a replaceable inlet valve nozzle for an oxygen regulator which will absolutely protect the valve disc from ignition by resisting the rapid compression of oxygen adjacent to the valve seat and simultaneously conducting heat away from the gas.

Another object is to provide an oxygen valve nozzle which will break up the gas stream into several sectionally small streams, allow the streams to be deflected by an inclined wall into a blind annular cavity before reuniting and passing out of the nozzle port into contact with the valve disc.

Another object is to provide a compact nozzle which has relatively large areas of metal in contact with the oxygen stream so as to achieve a higher degree of heat transfer from the oxygen gas to the metal body at the point where the heat is intense.

Another object is to provide a valve nozzle which can be easily manufactured of parts readily produced by automatic machines and will have the mechanical strength required to withstand the high pressures encountered.

Another object is to provide a safe nozzle for oxygen which may be used in regulators, control valves, and any other type of equipment having a nonmetallic valve disc which is to be connected directly to a source of high pressure oxygen.

Another object is to provide a nozzle which will inhibit foreign particles carried by the high velocity oxygen stream from damaging the valve disc.

Further objects of this invention will appear from a study of the drawing, the specification and the appended claims.

Referring now to the drawing in which a preferred embodiment of this invention is illustrated.

Figure 3:
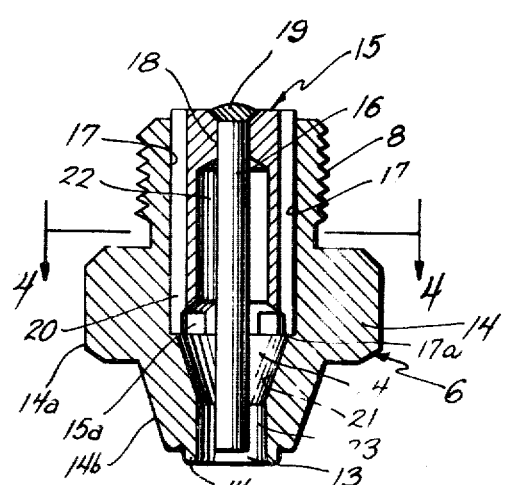
Fig. 3 is an enlarged cross sectional view of an inlet nozzle.
Figure 4:
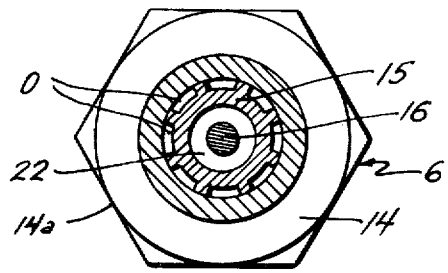
Fig. 4 is a section taken on line 4—4 of Fig. 3.
Figure 2:
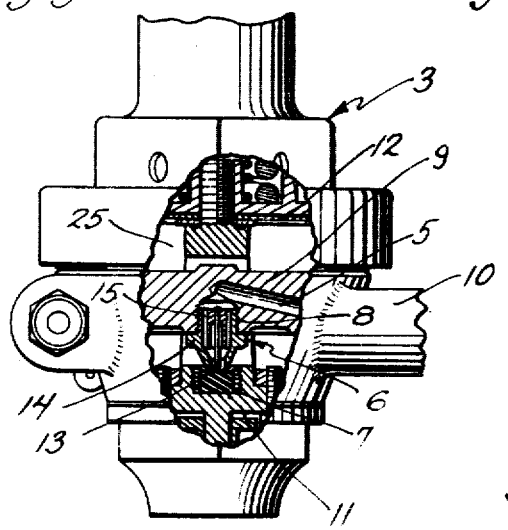
Fig. 2 is a cut away view of an oxygen regulator showing the location of the inlet nozzle.
Figure 1:
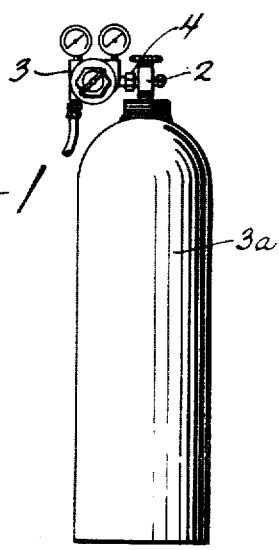
Fig. 1 is a view of an oxygen regulator attached to a storage cylinder.

The preferred method of mounting a conventional type oxygen regulator 3a on an oxygen storage cylinder 9 by means of a coupling 4 threaded into the oxygen valve 2 is shown in Fig. 1. In Fig. 2 an inlet nozzle 6 is shown mounted within a conventional regulator 3. The rear end of the nozzle 6 is in communication with the oxygen inlet passage 5 leading from the cylinder, and the forward end is in contact with the valve disc 7.

For purpose of mounting the nozzle 6 in the regulator body 10 a threaded portion 8 of the nozzle is screwed into a cavity in a bridge 9 formed integrally with the regulator body 10. The valve disc 7 is mounted in a support 11 which in turn is attached to the diaphragm 12 so that it is moved by the diaphragm 12 to open and close the inlet valve port 13. A further description of the construction of a regulator of this type will be found in Patent No. 1,514,217 issued to Messer.

In the preferred embodiment of the invention the nozzle 6 is composed of three parts, a nozzle body 14, a core 15 and a pin 16.

Referring to the nozzle body 14 a hex section 14a is provided on its external surface to receive a wrench for tightening and removing the unit whenever desirable and below the hex section 14a the nozzle body is provided with a tapering external surface which terminates at the bottom in a reduced end portion rounded to provide a land 14c surrounding the port 13. Although the sectional curved defined by the land may be varied in relationship to the material of which the valve disc 7 is made so that it will not cut or rupture the valve disc the preferred contour is semi-ellipti-cal with the broader part of the curve upon its lowest extremity.

The internal machining of the nozzle body 14 is such that the cylindrical cavity 17 extends downwardly well within the hex section 14a where it terminates in a shoulder 17a at its marginal edges and a converging conical passageway 21 leading to the port 13.

The core 15 comprises a body portion having a cylindrical outer contour which slips snugly into the cylindrical cavity 17. The outer surface of the core is fluted longitudinally to provide passages 17, and the inner end thereof which engages the shoulder 17a is castellated as at 15a to bring the passages 20 into the conical passageway 21. The castellations open radially inwardly in mutually opposing relationship so that gas streams flowing through the passages 20 can converge and mingle to some extent before entering the conical passage 21. Above the castellations 15a the core 15 is drilled out to provide an enlarged chamber 22 and a hole 18 of reduced diameter at the upper end thereof.

All metal parts are nonferrous, being made preferably of brass.

In assembling the parts the core 15 is passed downwardly into the central cavity 17 in the body 14 and the pin 16 inserted into the central hole 18 in the core 15. When the pin 16 is located so that it will be in close proximity with, but will not contact the valve disc 7, it is tacked in place by a drop of solder 19 on the rear end of the core 15.

When the core 15 is inserted into the central cavity 17 of the nozzle body 14, the longitudinal slots 20 on the outer surface of the core 15 become passages that run forward to the shoulder 17a and the conical portion 21 of the central cavity 17. This construction has been found to be superior to drilled holes because a greater number of smaller passages may be provided in a nozzle of a given size, and it is a less expensive form of construction than the drilling of a number of small holes.

When the end of the pin 16 is in place in the hole 18, the enlargement 22 becomes a dead end pocket above the castellations 15a. The lower end of the pin where it passes the castellations 15a serves as a deflecting wall for gases flowing out of the castellations 15a whereby some of the gases are deflected into the pocket 22 to disperse any hot compression wave. The downstream end of the pin 16 serves to increase the metal surface available for heat exchange contact with hot gases not initially deflected into the pocket 22. In some applications of the invention, as where a smaller sized nozzle is desired, it has been found that the lower end portion of the pin can be dispensed with as long as the salient features of the rest of the nozzle remain.

The operation of this invention is as follows: When the valve 2 on the oxygen container 1 is opened, a high velocity stream of oxygen flows through the fitting 4 and into the regulator inlet passage 5. At the end of this passage 5 it is forced to change direction and strikes the rear face of the nozzle 6. Part of the force of compression is dissipated and converted into heat at this point, for compression is forced to occur here due to the restricting action exerted by the plurality of passages 17 formed with smaller cross sectional area than the passage 5.

However, a portion of the rapidly flowing gas stream will move directly through the slots 17 against the shoulder 17a into the conical section 21 of the cavity. Here the inclined walls 20 assist the pin 16 in reflecting some portion of the gas streams backwardly into the pocket 22 surrounding the pin 16 within the core 15. More of the heat of compression is conducted away at this point by the walls of the cavity 22 and the pin 16.

Since moving gases have an inertia force which tends to keep them traveling in the same direction, a reversal, reverberation, or change in direction of a gas stream will be induced and compression will occur upstream of the obstruction in the path of the gas which causes the reversal. Furthermore, the gases flowing from the restricting passages into the enlarged space 24 will have a tendency to cushion the pressure wave. Consequently, the gas velocity and pressure on the downstream side of an obstruction will be reduced.

Because of this the gas streams are greatly reduced in velocity by the several reversals in direction and reductions and subsequent increases in passage area as they flow forwardly into the port 13 where the valve disc 7 receives the impact of the heat and pressure wave.

Comparative tests between the embodiment of this invention illustrated in the drawing and a standard type nozzle were made. It has been found that ignition of the disc is most likely to occur if the valve disc surface becomes scratched or roughened in use and the parts conducting the high pressure oxygen are allowed to stand in the bright sun until the residual contents are quite warm. This is an approximation of the worse situation to be found under service conditions. In the tests sun warmed oxygen was used with several valve discs which had become roughened. A regulator was equipped with a standard type nozzle and each disc was successively tested. The regulator was then attached to an oxygen cylinder and the cylinder valve opened to admit high pressure oxygen to the regulator and allow rapid compression to take place. Fifteen discs were tested with the standard nozzle, and each disc was examined after testing to see if ignition had occurred. This procedure was then repeated using an embodiment of this invention and fifteen more like discs. The old type nozzle produced six ignitions out of fifteen, and the new nozzle produced no ignitions at all out of fifteen tests.

Further tests were made using a seat ignition testing device which consisted of a tube about 18 inches long fitted at one end with a quick opening valve and attached to a cylinder of high pressure oxygen. The other end of this tube was threaded so that either of the two nozzles to be tested could be inserted. A valve disc was firmly clamped in position closing the end of the nozzle. The device was then operated by installing a valve disc and quickly opening the inlet valve to allow compression to take place at the end of the tube. This is probably one of the most rigorous tests to which a combination of nozzle and disc may be put. Thirty discs of different materials were tested with a standard type nozzle and resulted in twenty-seven ignitions. Thirty discs of the same materials tested with the embodiment of this invention resulted in no ignitions at all.

Since the process of valve disc ignition takes place in such split second intervals of time, it is impossible to determine why one nozzle will produce results which are so greatly superior to another. However, it is believed that the nozzle of this invention owes its superiority to the fact that the shock of compression is first dissipated by the narrow passages through the slots 17 in the core 15 and secondly reflected backwards by the pin and the slanting wall 21 of the conical section 23 into the core cavity 22 rather than absorbed directly by the valve disc 7. The square shape (rather than round) of the passages 17 is also believed to be of benefit in reducing the compressive force while the central pin 16 serves to conduct away heat which is formed in the core cavity 22 and at the face of the disc.

This invention has been shown embodied in one form in a pressure reducing regulator for oxygen, but it is intended that the invention is limited to this embodiment alone. Such nozzles can also be used in other types of valves, for air or other gases, and the design of the nozzle itself can be varied without departing from the invention whose scope is shown in the following claims.

What is claimed is:

1. A valve nozzle comprising a body, having a cavity extending from its upstream end and a second smaller diameter cavity extending from its downstream end, a conical passage having a shoulder at its upstream end connecting said two cavities, and an externally fluted core the flutes extending the length thereof and disposed in said upstream cavity against said shoulder, said core having a central shock-absorbing pocket opening into said conical passage the downstream end of said pocket being widened to a diameter greater than that of the bottom of the flutes.

2. A valve nozzle comprising an elongated body adapted to be attached to the valve inlet conduit, a passage therethrough, a core having external flutes on its outer surface and extending the length thereof disposed in said passage said flutes connecting the upstream end of the nozzle with the passage, a conical portion of said passage disposed at the end of said core, a shock absorbing cavity within said core opening into the conical portion of said passage, and an outlet port in communication with said passage.

3. A valve nozzle comprising an elongated body adapted to be attached to the valve inlet conduit, a passage therethrough, a core having external flutes extending over its length disposed in said passage to block same and provide a plurality of passages as defined by said flutes connecting the upstream end of said body with the portion of said passage downstream with the core, a cavity within said core, a conical portion of said passage disposed at the mouth of said cavity, an outlet port in communication with said cavity, and a pin extending axially from said cavity into said outlet port.

4. A valve nozzle comprising an elongated body adapted to be attached to the valve inlet conduit; a passage extending through said body and having a major diameter portion, a minor diameter portion and a conical walled intermediate portion; a core having external flutes thereon extending its entire length, said core being received in the major diameter portion of said passage; a cavity within said core opening into the conical portion of said passage, the mouth of said cavity having a diameter greater than the remainder to connect the end of each of said flutes with the intermediate portion of said passage; and an axial pin supported by said core and extending into the small diameter portion of said passage.

5. A valve nozzle comprising a body having a cylindrical cavity extending inwardly from its upstream end, an outlet port of lesser diameter than said cavity extending from the downstream end of said body, a conical passage connecting said cavity with said outlet port, and a cylindrical core disposed in said cavity having the same diameter as said cavity and having longitudinal flutes thereon extending the length of the cavity disposed in the cavity, said core having a pocket opening into said conical passage, the open end of said pocket being of such diameter that the ends of the flutes are in communication with said pocket.

6. In a regulator nozzle having an opening therethrough terminating in a valve port, a core supported in the end of said opening remote from said port, the periphery of said core being fluted and defining passages connecting the end of the nozzle to the middle of said opening and said core having an inner cavity whose open end faces said port, the inner cavity serving as a compression chamber to absorb the shock wave when gas under high pressure is introduced into the nozzle, and a pin supported by said core extending through said cavity to a point adjacent said port.

7. An ignition resistant valve nozzle comprising a body having an elongated annular space with an open end and a sealed end, said body also having a plurality of longitudinal passages opening from said sealed end and communicating with said annular space near the middle thereof, and means including a conical wall disposed at the inner end of said passages for deflecting gas flow from said passages into said annular space, the open end of said annular space constituting an annular valve port for said body.

WILLIAM C. BUTTNER.
SAVIN L. SUNDSTROM.

REFERENCES CITED

The following references are of record in the file of this patent:

UNITED STATES PATENTS

| Number | Name | Date |
| --- | --- | --- |
| 1,514,217 | Messer | Nov. 4, 1924 |

Certificate of Correction

Patent No. 2,575,312 November 13, 1951

WILLIAM C. BUTTNER ET AL.

It is hereby certified that error appears in the printed specification of the above numbered patent requiring correction as follows:

Column 6, line 13, before "intended" insert *not*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*